Patented Nov. 19, 1929

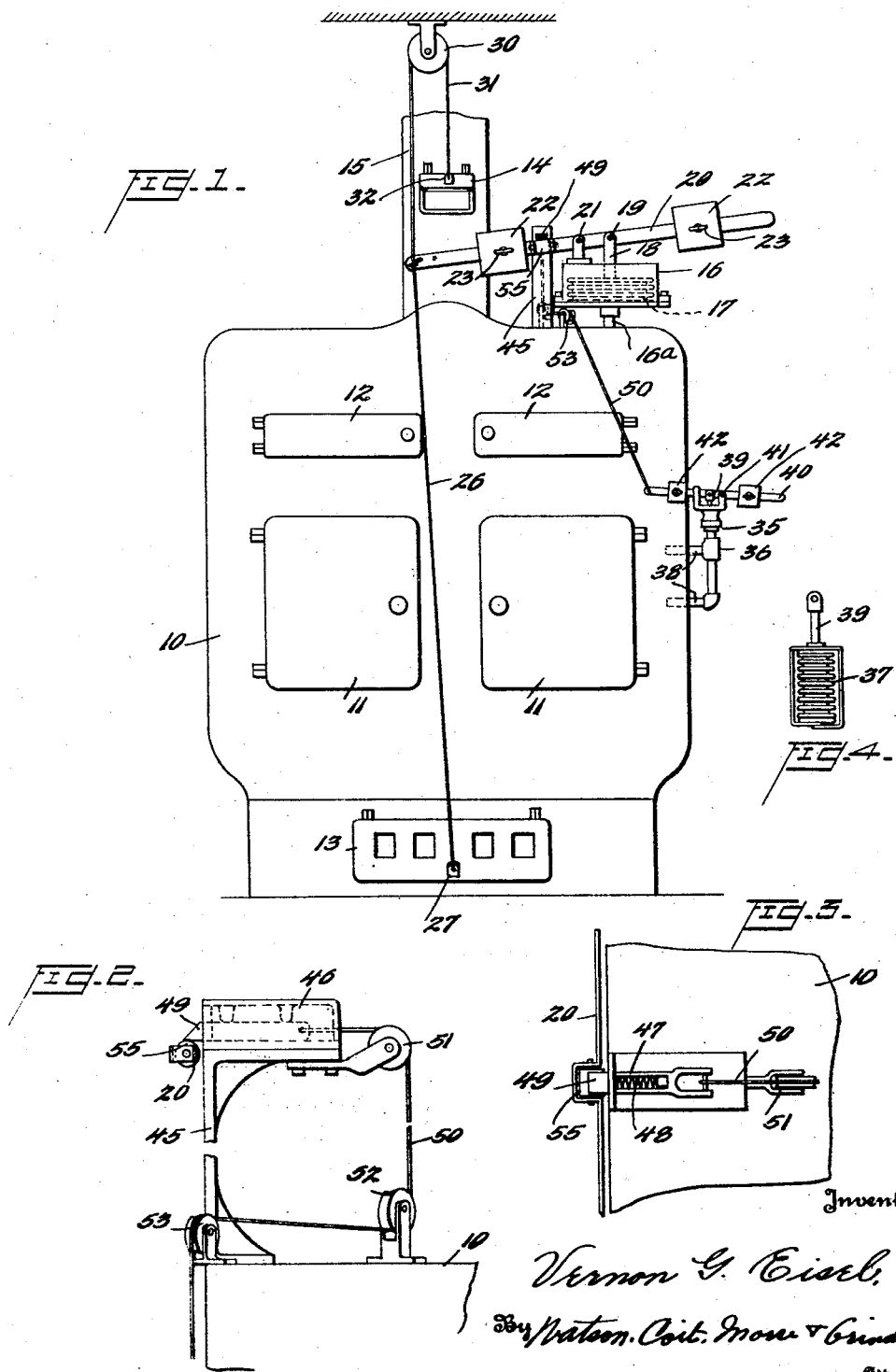

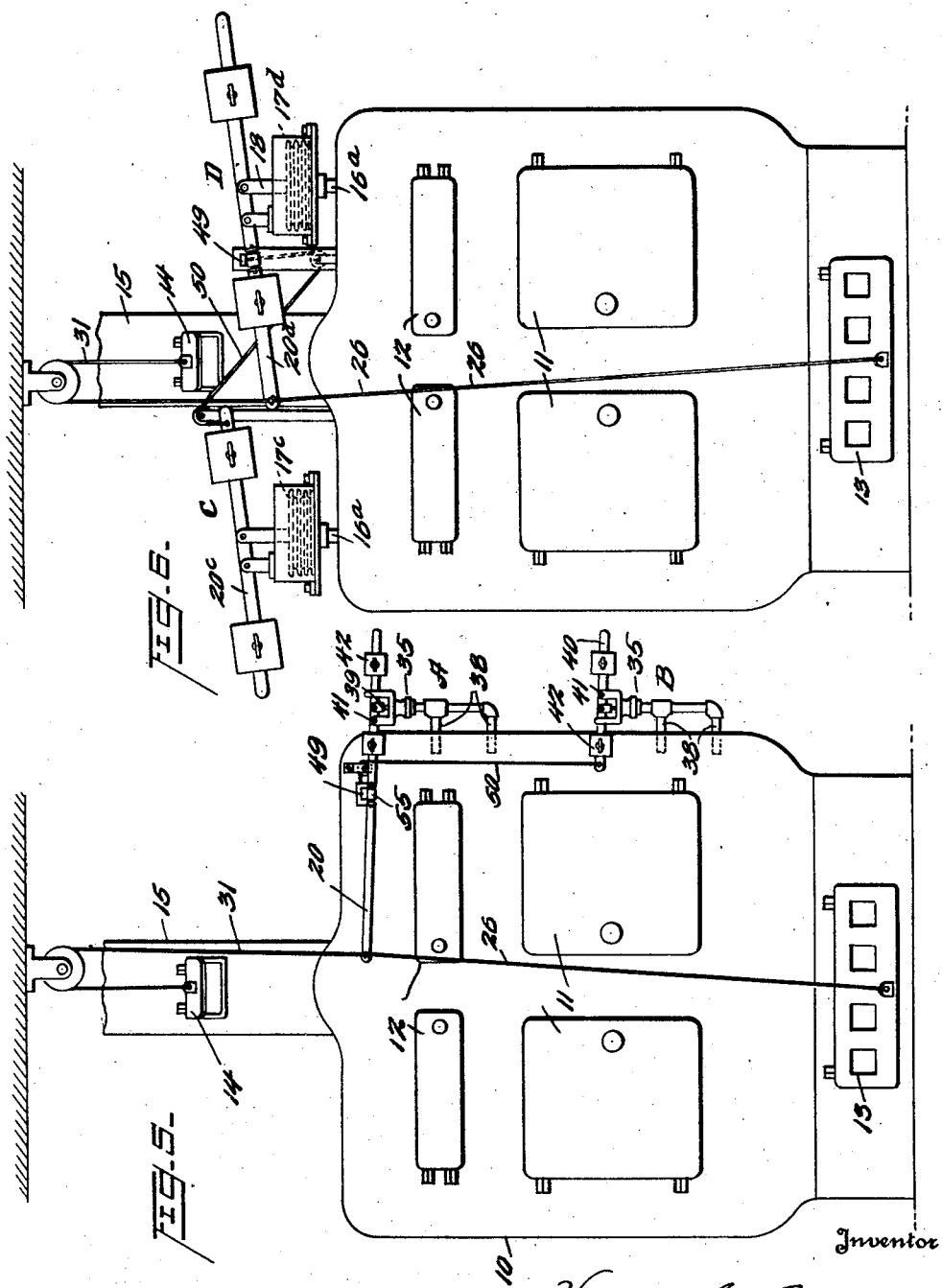

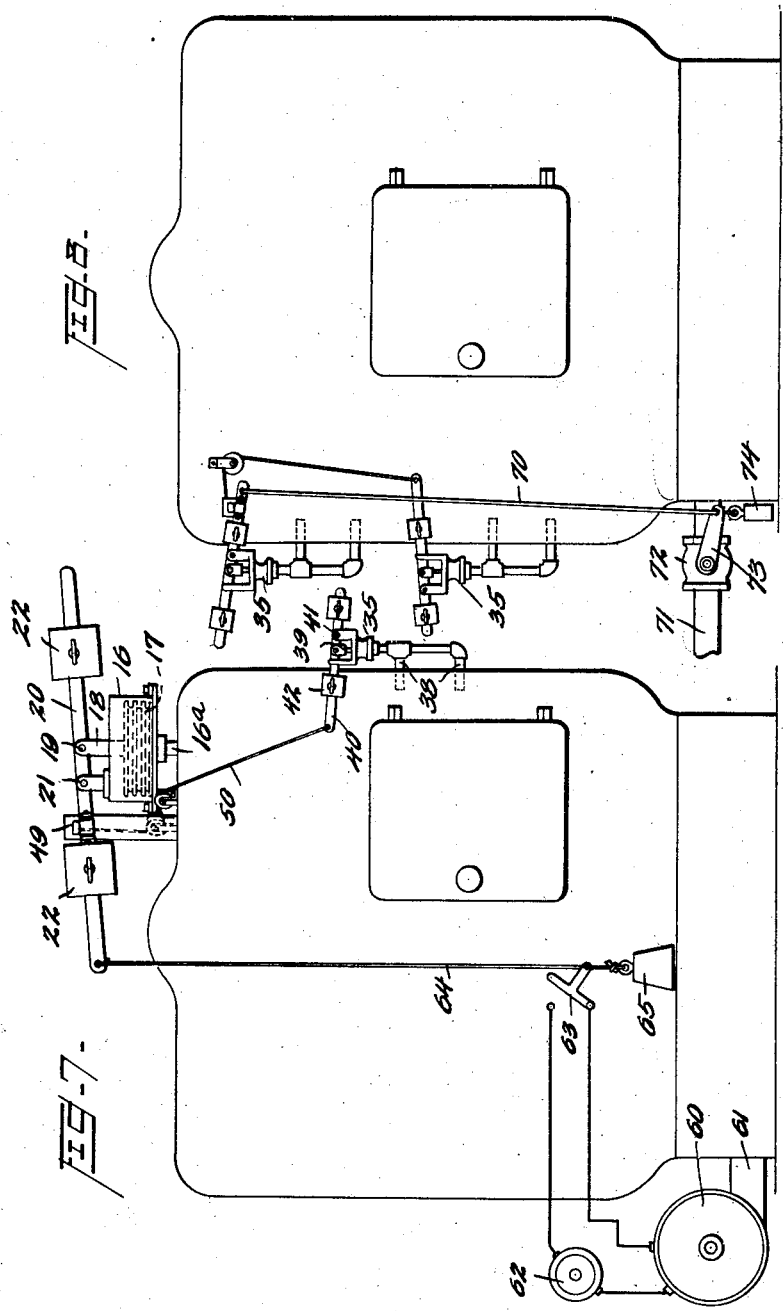

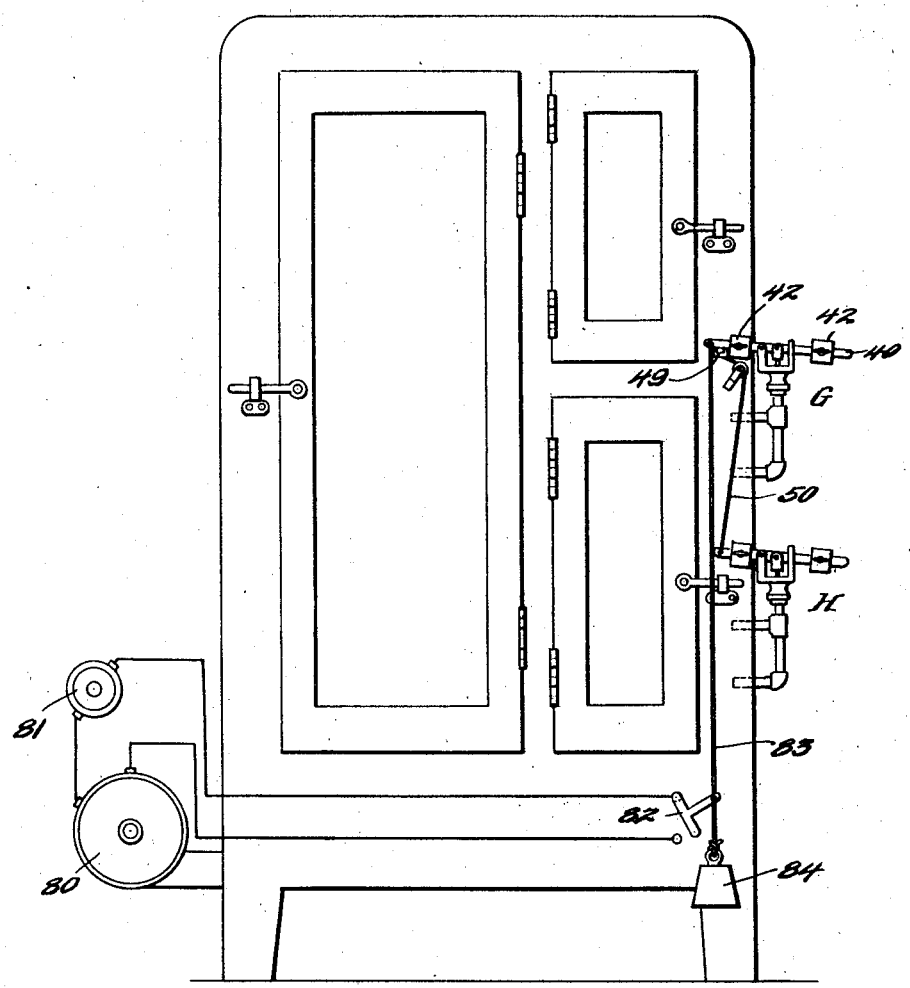

1,736,491

UNITED STATES PATENT OFFICE

VERNON G. EISEL, OF BALTIMORE, MARYLAND

AUTOMATIC CONTROL DEVICE FOR HEAT-TRANSFER SYSTEMS

Application filed December 29, 1927. Serial No. 243,440.

This invention relates to automatic control devices for heat transfer systems, and more particularly to the type adapted for the regulation of heating or cooling apparatus operating over wide ranges of temperature or pressure.

Thermostatic and pressure diaphragm control devices have been long used for the control of heat transfer systems, but the range over which they operate is quite small, so that they maintain a constant condition in the system, which requires frequent attention to the supply arrangements of the system.

It is the broad object of the invention to provide an automatic control which will have a great range of operation and permit a wide variation of conditions within its limits.

It is a further object of the invention to provide automatic control devices for steam, hot water or vacuum heating systems, and refrigerators, in which the device may control the draft, fuel, or refrigerant supply.

Ordinarily, the automatic control of furnace drafts for heating boilers operates to shut off the draft at about 4 oz. pressure, and to open the draft when the pressure falls to about 1 oz., or over similar small ranges of pressure. This is unsatisfactory for vacuum heating systems, as the steam pressure control will open the draft and build up the pressure, thus preventing the operation of the system under vacuum conditions. The present invention contemplates the use of a latching mechanism to prevent the opening of the draft until the water temperature reaches a predetermined minimum.

It is therefore an object of the invention to provide a device of this character which will control the dampers of a heating system under conditions of vacuum.

It has been proposed to operate a boiler heating system by closing the drafts at about 4 oz. pressure, and to open them when, under conditions of vacuum, the boiler water reaches a temperature of about 150° F. However, pressure responsive and temperature responsive control devices heretofore used operate only over limited ranges, so that it has been heretofore impossible to accomplish the desired result automatically. It is therefore another object of the invention to provide a control mechanism for a boiler heating system, which will cut off the draft at a maximum condition of fairly low pressure, and to open the draft at a condition of minimum low temperature of the boiler water.

As the ranges over which the known control devices operate are quite small, the applicant proposes to combine the action of a pressure responsive control and a temperature responsive control to accomplish the desired result.

It is therefore a further object of the invention to provide an automatic control device for the furnace draft by the combined action of a steam pressure-operated control device and a latching mechanism therefor, controlled by a water temperature-actuated device.

Other objects and features of novelty will be apparent from the following description and the accompanying drawings, in which:

Fig. 1 is a front view of a boiler heating unit for a heating system, showing the draft control mechanism according to the present invention;

Fig. 2 is a detail of the latching mechanism;

Fig. 3 is a plan view of the structure shown in Fig. 2;

Fig. 4 is a detail of the sylphon used in the water temperature control device;

Fig. 5 is a front view of a boiler for a hot water heating system, showing the control mechanism for the furnace dampers actuated by a pair of water temperature thermostats;

Fig. 6 is a front view of a steam boiler, showing the control mechanism for the furnace dampers actuated by a pair of steam pressure diaphragms;

Fig. 7 is a front view of a boiler for a vacuum heating system, as provided with a blower, showing the control mechanism applied to turning on and cutting off the blower motor;

Fig. 8 is a front view of a gas fired boiler, with the control mechanism applied to turning on and cutting off the gas supply; and
Fig. 9 is a front view of a refrigerator or ice machine, showing the control mechanism as applied to turning on and cutting off the operating motor.

Referring more particularly to the drawings, the boiler heating unit 10 is of the usual type now in operation in many heating installations, and consists essentially of a furnace and a boiler to supply the radiation of the heating system. This unit is provided with fire doors 11, clean-out doors 12, a main damper 13, and a check damper 14 which is mounted on the smoke pipe 15.

The pressure responsive control device is indicated generally at 16 and comprises a pressure diaphragm 17 which communicates by means of a pipe 16ª with the steam space of the boiler. The upper portion of the diaphragm 17 constitutes a plunger 18 pivotally connected as at 19 to a lever 20 which in turn is pivoted at 21 to a stationary abutment. Sliding weights 22 are mounted on the lever 20 for adjusting the range of pressure over which it operates, and are secured in adjusted positions by set screws 23. The free end of the lever 20 is connected to a chain 26, the other end of which is secured to a lug 27 on the main damper 13.

It will be obvious that when the steam pressure in the boiler rises above the limit set by the sliding weights 22, the diaphragm 17 will expand, thrusting the plunger 18 upward, and permitting the other end of the lever 20, the chain 26, and the main damper 13 to lower, cutting off the draft. Then when the pressure drops below the lower limit set by the sliding weights 22, the diaphragm 17 will contract, pulling down the plunger 18, and raising the free end of the lever 20 and the chain 26 so as to open the draft. This structure and operation is old in the art, and has been long used for the control of heating systems operating under steam pressure.

A pulley 30 is hung from a stationary support in the boiler room, and a chain 31 secured to a lug 32 on the check damper 14 is trained over the pulley 30 and secured to the free end of the lever 20. By this arrangement, the check draft is opened when the main damper is closed, and the check damper is also closed when the main damper is opened.

The temperature-operated control device is indicated generally at 35, and comprises a chamber 36, in which a sylphon diaphragm 37 is mounted and actuated by the change in temperature of the water in the boiler. Pipes 38 communicate with the boiler water, so that the temperature of the well is the same as that of the boiler water. A plunger 39 connected to the sylphon 37 is pivoted to a lever 40 which in turn is pivoted at 41. The lever 40 carries adjustable sliding weights 42 exactly similar to the weights 22 described in connection with the steam-operated control device.

It will be obvious that when the temperature of the boiler water drops below the lower limit set by the weights 42, the sylphon 37 will contract and the plunger 39 will draw the adjacent end of the lever 42 downwardly. When the temperature rises above the upper limit set by the weights 42, the sylphon 37 will expand and the plunger 39 will thrust the adjacent end of the lever 40 upwardly. This structure and operation is old in the art, as it has been widely used for the control of hot water heating systems.

The latching mechanism for the steam control device is mounted on a bracket 45 which is located near the vertical path of the lever 20, as shown in Fig. 1. A guide member 46 is mounted on the bracket as shown in Fig. 2 and slidably receives a latch bar 47. A spring 48, as shown in Fig. 3, normally tends to urge the latch bar in its extended position as shown, and the outer end of the latch bar is beveled as at 49 so that it will yield to permit the passage of the lever 20 in its downward movement, but will serve as a stop to prevent its passage in its upward movement. The inner end of the latch bar is connected to a chain or cord 50, trained over pulleys 51, 52, 53 and secured to the plunger end of the lever 40, as shown in Fig. 1. To decrease the friction of operation of the latch 47, a roller 55 is mounted on the bar 20 at the point where it engages the latch bar.

The operation of the control mechanism according to the present invention is as follows: The sliding weights 22 are adjusted so as to operate over a small range of pressure. For instance, they may be set so that the pressure control device will close the draft 13 at 4 oz. pressure, and would normally operate to open the draft when the pressure falls to 1 oz. Under these conditions, the boiler is fired, and the pressure is built up to 4 oz. This pressure is sufficient to expand the pressure diaphragm 17 and elevate the plunger 18, causing the free end of the lever 20 to lower and cut off the main draft, 13. In thus lowering, however, the free end of the lever 20 rides over the bevel 49 of the latch 47, which yields, due to the compression of the spring 48, and permits the lever 20 to reach its lowest position. When the roller 55 has passed the latch bar, the spring 48 urges it to its extended position. When the pressure drops to 1 oz., the diaphragm 17 will contract, tending to raise the free end of the lever 20, which is locked down by the latch 47. This prevents the opening of the main draft 13, and the pressure drops still lower until a vacuum condition is reached. Under the vacuum condition, the system continues to supply radiation, and the temperature of the water in the boiler gradually lowers.

When the temperature of the water in the boiler falls below the lower limit set by the sliding weights 42 of the temperature control device 35, the sylphon 37 contracts, and the plunger 39 pulls down the adjacent end of the lever 40, which pulling on the cord 50 withdraws the latch 47 against the action of the spring 48. This releases the roller 55 and the lever 20, and the vacuum condition existing in the diaphragm 17 will immediately pull down the plunger 18 and raise the free end of the lever 20, thus opening the main draft 13.

Opening the main draft 13 of course causes the furnace to increase the temperature of the boiler water. When this temperature exceeds the upper limit set by the weights 42, the sylphon 37 will expand, thrusting the plunger 39 upwardly, which causes the adjacent end of the lever 40 to also move upwardly, causing a slack in the cord 50, which is immediately taken up by the spring 48, thrusting the latch 47 into its extended position. The temperature control device therefore automatically resets the latching mechanism so that the operation may be repeated.

With a heating system operating as hereinbefore described, the control is entirely automatic so that the only attention required by an attendant is to set the sliding weights of the two control devices to the desired ranges. The radiation of the system will be the governing factor to determine the condition under which the system operates.

The broad idea of the invention hereinbefore described is readily adaptable to the control of the draft for the furnace of a hot water heating system, and this modification of the invention is shown in Fig. 5. For the sake of clearness, many of the parts are given the same reference characters as those used in the description of the structure shown in Fig. 1, but it is to be understood that the boiler shown in Fig. 5 is for a hot water heating system.

In this arrangement, two temperature control devices are provided, which are so similar to the one indicated at 35 in Fig. 1 that they are not to be again described in detail. The two temperature-operated control devices are indicated generally at A and B respectively. The control device A is arranged to operate at between 150° F. and 160° F. This provision may be made either by adjusting the sliding weights 22 or by inserting a different sylphon, such as 37 shown in Fig. 4, which has a different temperature characteristic.

The temperature control device B is arranged to operate over a decreased temperature range, for example, from 110° F. to 120° F. Both control devices are of course in communication with the water in the boiler, so that they are directly responsive to the temperature thereof.

The operation of the control device shown in Fig. 5 is as follows:

When the temperature of the boiler water reaches 160° F., the sylphon A expands and the plunger 39 pushes upward on the adjacent end of the lever 20, which being pivoted at 41 causes a downward thrust on the outer end of the lever 20 which is connected to the chain or cord 26. As the free end of the lever 20 moves downward, the roller 55 rides over the latch 49, depressing it against the action of the spring 48. When the free end of the lever 20 is moved downward sufficiently to close the damper 13 and open the check damper 14, the spring 48 urges the latch 49 outward and locks the free end of the lever 20 in its lowered position. As the temperature of the boiler water falls, the sylphon 37 contracts and the weight 22, which is remote from the cord 26, tends to pull the free end of the lever 20 upward, but is prevented by the latch 49. The temperature of the boiler water therefore continues to lower until it reaches 110° F. The lowered temperature tends to contract the sylphon 37 in the temperature control device B, and the weight 42, added to the contraction of the sylphon 37, pulls downward on the cord 50 which releases the latch 49. This permits the free end of the lever 20 to move upward due to the contraction of the sylphon 37 in the control device A, opening the main draft 13 and closing the check draft 14. This will cause the furnace to heat the boiler water until it reaches 160° F., at which time the operation is repeated.

The broad idea of the invention is also adapted for the control of steam heating plants. Fig. 6 shows a modification of the invention in which the boiler and its associated parts are given the same reference characters as those in Fig. 1, although it is to be understood that in this modification the heating is by means of steam.

For controlling this type of boiler, two pressure responsive control devices C and D are provided, which are similar in construction to that indicated generally at 16 in Fig. 1 and will therefore not be described in detail. The pipes 16$^a$ are connected to the steam part of the boiler so as to be subject to the steam pressure existing within the boiler, at all times.

The pressure responsive control device D is responsive to a range of high steam pressures, for example, from 240 to 250 pounds per square inch, and the pressure responsive control device C is arranged to be actuated by a lower range of pressure, for example, from 100 to 110 pounds per square inch.

The two pressure responsive control devices C and D may be adjusted for the desired pressure ranges by either varying the diaphragm 17 so that it will respond to the desired pressure, or by adjusting the sliding weights 22.

When the steam pressure reaches 250 pounds per square inch, the diaphragm 17$^d$ will expand, and the plunger 18 will force the free end of the lever 20 downward past the latch 49, which will lock it in position. The cord 26 secured to the free end of the lever 20 will close the main draft 13 and open the check draft 14. The parts will remain in this position as the steam pressure drops off, because although the diaphragm 17$^d$ will contract and try to open the main draft, the latch 49 will serve to prevent it. The steam pressure continues to fall off until it reaches 100 pounds per square inch. This decreased pressure will contract the diaphragm 17$^c$ which will pull down on the free end of the lever 20$^c$, which in turn will pull on the cord 50 and release the latch. The contracted condition of the diaphragm 17$^d$ will then pull up the free end of the lever 20$^d$, which will open the main draft 13 and close the check draft 14. Under the increased draft, the furnace fire will build up the boiler pressure until it reaches 250 pounds per square inch, and the operation will be repeated.

The control arrangement of the present invention is adapted for the control of the draft by a blower motor, as well as by merely opening and closing dampers. This modification of the invention is shown in Fig. 7. In this figure, the control devices are identical with those shown in Fig. 1 for a vacuum heating system, but instead of the dampers 13 and 14, a blower motor 60 is provided, the blower conducting the draft to the furnace through the pipe 61. The source of power for the motor 61 is indicated diagrammatically by a generator 62, and the circuit between the generator and motor is interrupted by a switch 63, which is connected to a cord 64. The action of the combined control devices is transmitted to the cord 64 in exactly the same manner as the cord 26 in Fig. 1. It will therefore be readily apparent that the upward motion of the cord 64, corresponding to the upward motion of the cord 26 in Fig. 1, which serves to open the draft 13, will close the switch 63 in Fig. 7. A weight 65 is secured to the lower end of the cord 64, and serves to open the switch 63 when the control devices permit the cord 64 to lower.

The present invention is also adapted for the control of gas fired boilers, whether supplying hot water, steam, or vapor vacuum heating systems. In Fig. 8 a modified form of the invention is shown, in which the control devices operate in exactly the same manner as those shown in Fig. 5. The cord 70 however, which corresponds to the cord 26 in Fig. 5, serves to cut off the supply of fuel to the furnace, instead of opening the draft. The fuel pipe 71 which supplies the fuel to the furnace is provided with a valve 72 having a handle 73, the outer end of which is secured to the cord 70. A weight 74 tends to lower the handle when the control devices fail to exert an upward pull on the cord 70.

At the upper limit of the range desired, the cord 70 is lowered, which cuts off the valve 72 due to the weight 74 pulling on the valve handle 73. The control lever is locked in position, and so remains until the lower limit is reached, at which time the lower range control device releases the latch and permits the cord 70 to be pulled upward, opening the fuel supply valve.

Another phase of the broad idea of my invention is the control of refrigerating systems. An arrangement for this purpose is shown in Fig. 9. A pair of temperature control devices G and H are provided, which are arranged quite similar to those shown in Fig. 5, with the exception that the action of some of the parts is reversed. The control device G, by reason of a selected sylphon 37 or the adjustment of the sliding weights 42, is arranged to operate over a lower range of temperatures, for example, from 30° to 40° F. The control device H is similarly arranged to operate over an upper range of temperatures from 50° to 60° F.

The control of the refrigerant for the embodiment shown is constituted by a motor 80, where the refrigerating machine is of the electric type. The source of supply of current to the motor 80 is indicated diagrammatically by a generator 81, and the circuit between the motor 80 and the generator 81 is controlled by a switch 82. A cord 83 is attached to the switch to connect it with the combined action of the two control devices. A weight 84 serves to close the switch when the control devices permit the cord 83 to lower.

When the temperature of the refrigerant falls below 30°, the sylphon 37 in the control device G contracts and causes the other end of the lever 40 to raise, and its upward movement through the cord 83 opens the switch 82. At the same time, the latch 49, which is reversed in this figure, engages the lever 40 to hold it in its raised position. As the refrigerant absorbs the heat from the material being cooled, its temperature is increased, causing the sylphon 37 in the control device G to expand, but the latch 49 prevents it from moving the lever 40. The parts therefore remain stationary until the temperature reaches 60° F. This condition causes the sylphon 37 in the control device H to expand, and the pivoting of the lever exerts a pull on the cord 50, which releases the latch 49. The lever 40 then, under the influence of the sylphon 37 of the control device G, will lower the end of the lever 40, permitting the weight 84 to close the switch 82. A motor 80 then causes the temperature of the refrigerant to be reduced until the system reaches about 30° F., and the operation is repeated.

While the invention has been shown in great detail for several embodiments thereof for the purposes of adequate disclosure, the invention is not limited to any of the details or embodiments shown, but includes such embodiments of the broad idea as come within the scope of the appended claims.

Having thus described the invention, what is claimed as new and desired to be secured by Letters Patent is:

1. In combination with a heat transfer system, means for supplying to said system a medium operable to gradually change the condition prevailing in said system, an automatic control mechanism for regulating said supply means, comprising means for turning on and cutting off said supply of medium, a control device responsive to one predetermined extreme condition of a range of conditions in said system for actuating said means to cut off said supply, means for preventing actuation of said first named means to turn on said supply, and a second control device responsive to the other extreme condition of said range for releasing said preventing means.

2. In combination with a heat transfer system, means for supplying to said system a medium operable to gradually change the condition prevailing in said system, an automatic control mechanism for regulating said supply means, comprising means for turning on and cutting off said supply of medium, a control device responsive to one predetermined extreme condition of a range of conditions in said system for actuating said means to cut off said supply, latching mechanism for preventing actuation of said means to turn on said supply, and a second control device responsive to the other extreme condition of said range for releasing said latching mechanism and permitting the first mentioned control device to turn on the supply of medium.

3. In combination with a heat transfer system, means for supplying to said system a medium operable to gradually change the conditions prevailing in said system, an automatic control mechanism for regulating said supply means, comprising means for turning on and cutting off said supply of medium, a control device including a lever and means for actuating said lever in one direction in response to a change of condition in the system approaching one predetermined extreme condition, and in the opposite direction in response to a change of condition in the system approaching the other extreme condition of said range, said lever being connected to said means for turning on and cutting off the supply of medium, a latch engaging said lever to prevent the turning on of the supply, and a device for releasing said latch responsive to a predetermined extreme condition of another range of conditions in said system.

4. In combination with a vapor vacuum heating system, means for supplying thereto a medium operable to gradually increase the temperature prevailing therein, an automatic control mechanism for regulating said supply means, comprising means for turning on and cutting off said supply of medium, a control device for actuating said means at a maximum pressure to cut off said supply, and to turn on said supply when a minimum temperature is reached.

5. The combination of a steam boiler pressure control device for furnace dampers, of a latching mechanism for said device controlled by the water temperature in the boiler.

6. In combination with a boiler steam pressure control device for furnace dampers, adapted to close at comparatively low pressure and to open at a minimum pressure, of a latching mechanism for preventing the opening of the damper, and a device for releasing said latching mechanism when the temperature of the water falls below a predetermined degree.

7. The combination of a steam boiler pressure control device for furnace dampers, adapted to close at comparatively low pressure and to open at a minimum pressure, of a latching mechanism for preventing the opening of the damper, a device for releasing said latching mechanism when the temperature of the water falls below a predetermined degree, and means for automatically resetting said latching mechanism.

8. The combination of a steam boiler pressure actuated control device for furnace dampers, including a lever, and means for actuating said lever in one direction at a comparatively low pressure, and in the opposite direction when the boiler pressure falls to a predetermined minimum, said lever being connected to the furnace damper to open and close it at the extremes of its movement, of a latch for engaging said lever to prevent the opening of the damper, and a device for releasing said latching mechanism when the temperature of the water in the boiler falls below a predetermined minimum.

9. An automatic damper control device for boiler heating systems including a steam boiler and a furnace, comprising in combination a lever connected to the furnace damper, a device associated with said lever for closing the damper at a low pressure and opening it at a minimum pressure, a latch engaging said lever for preventing the opening of said damper, and a device responsive to the temperature of the water in the boiler for releasing said latch.

10. An automatic damper control device for boiler heating systems including a steam boiler and a furnace, comprising in combination a lever connected to the furnace damper, a device associated with said lever for closing the damper at a low pressure and opening it at a minimum pressure, a latch engaging said lever for preventing the opening of said damper, a second lever connected to said latch, and a device actuated by the temperature of the water in the boiler for moving said lever in one direction when the temperature falls below a predetermined minimum, and in the other direction when the temperature rises above a predetermined maximum.

11. An automatic damper control device for boiler heating systems, comprising a steam pressure responsive means for closing the damper when the pressure exceeds a predetermined degree, and a mechanism controlled by the temperature of the water in the boiler for preventing the opening of said damper until the temperature falls below a predetermined degree.

12. An automatic control device for boiler heating systems, comprising in combination, a device actuated by variation of pressure in the boiler and a device actuated by change in temperature in the boiler water, and means actuated by the combined action of said devices for opening and closing the furnace dampers.

13. In combination with the furnace dampers of a boiler heating system operating to supply radiation under conditions ranging from a low maximum pressure to a vacuum condition at a minimum temperature, a control mechanism for closing the furnace dampers at said low maximum pressure condition, and opening said dampers at said minimum temperature condition of vacuum.

14. In combination with the draft operating mechanism of the furnace of a boiler heating system operating to supply radiation under boiler conditions ranging from a predetermined low maximum steam pressure to a vacuum condition at a predetermined minimum temperature of boiler water, a steam pressure control device connected to said draft operating mechanism and operating to cut off the draft at said predetermined pressure, and normally operating to throw on the draft at a minimum pressure, mechanism for preventing said pressure device from throwing on the draft, and a temperature operated device connected to said preventing mechanism to render it inoperative when the temperature of the boiler water reaches the predetermined minimum.

In testimony whereof I hereunto affix my signature.

VERNON G. EISEL.